(12) United States Patent
Hölderle

(10) Patent No.: US 11,331,785 B2
(45) Date of Patent: May 17, 2022

(54) SUPPLEMENTARY SUPPORT ASSEMBLY FOR A WORKPIECE SUPPORT ASSEMBLY

(71) Applicant: Festool GmbH, Wendlingen (DE)

(72) Inventor: Rüdiger Hölderle, Aichelberg (DE)

(73) Assignee: FESTOOL GmbH, Wendlingen (DE)

( * ) Notice: Subject to any disclaimer, the term of this patent is extended or adjusted under 35 U.S.C. 154(b) by 42 days.

(21) Appl. No.: 16/772,601

(22) PCT Filed: Dec. 12, 2018

(86) PCT No.: PCT/EP2018/084523
§ 371 (c)(1),
(2) Date: Jun. 12, 2020

(87) PCT Pub. No.: WO2019/115602
PCT Pub. Date: Jun. 20, 2019

(65) Prior Publication Data
US 2021/0078156 A1 Mar. 18, 2021

(30) Foreign Application Priority Data

Dec. 14, 2017 (DE) .......................... 10 2017 130 042

(51) Int. Cl.
*B25B 11/00* (2006.01)
*B25H 1/08* (2006.01)
(Continued)

(52) U.S. Cl.
CPC ............. *B25H 1/08* (2013.01); *B23D 47/025* (2013.01); *B25H 1/04* (2013.01); *B27B 5/16* (2013.01)

(58) Field of Classification Search
CPC ... B25H 1/08; B25H 1/04; B25H 1/14; B25H 1/0078; B23D 47/025; B23D 45/046;
(Continued)

(56) References Cited

U.S. PATENT DOCUMENTS

| | | | | |
|---|---|---|---|---|
| 4,677,920 A | * | 7/1987 | Eccardt | B23D 47/025 108/152 |
| 5,105,862 A | * | 4/1992 | Skinner | B23D 47/025 144/286.1 |

(Continued)

FOREIGN PATENT DOCUMENTS

| | | | | |
|---|---|---|---|---|
| AU | | 566592 | 10/1987 | |
| AU | | 566592 B2 | * 10/1987 | ............... B25H 1/08 |

(Continued)

*Primary Examiner* — Lee D Wilson
*Assistant Examiner* — Craig Crowell Baker
(74) *Attorney, Agent, or Firm* — Hoffmann and Baron, LLP

(57) ABSTRACT

A supplementary support assembly for a workpiece support assembly of a semi-stationary machine tool, wherein a workpiece support body of the workpiece support assembly has a base supporting surface, which is substantially horizontal in use, for supporting a workpiece for sawing by a tool of the machine tool, wherein the supplementary support assembly has a supplementary supporting surface and a support body with support body mounting means for detachably mounting on the workpiece support assembly, wherein when the supplementary support assembly is mounted on the workpiece support assembly the supplementary supporting surface is at least substantially aligned with the base supporting surface.

40 Claims, 6 Drawing Sheets

(51) Int. Cl.
*B23D 47/02* (2006.01)
*B25H 1/04* (2006.01)
*B27B 5/16* (2006.01)

(58) Field of Classification Search
CPC .. B27B 5/16; B27B 27/08; B27B 5/06; B23Q 1/74; Y10T 83/7697
USPC .................................................... 17/41–75
See application file for complete search history.

(56) References Cited

U.S. PATENT DOCUMENTS

| | | | | |
|---|---|---|---|---|
| 5,181,448 A | * | 1/1993 | Terpstra | B23D 45/044 |
| | | | | 83/468.3 |
| 5,201,863 A | * | 4/1993 | Peot | B23D 47/025 |
| | | | | 83/432 |
| 5,458,171 A | * | 10/1995 | Ward | B27F 1/08 |
| | | | | 144/144.1 |
| 5,644,964 A | * | 7/1997 | Price | B23D 47/04 |
| | | | | 144/243 |
| 7,156,008 B2 | * | 1/2007 | Talesky | B23D 47/04 |
| | | | | 83/468.2 |
| 8,424,434 B2 | * | 4/2013 | Koegel | B27B 5/243 |
| | | | | 83/477.2 |
| 9,027,450 B1 | * | 5/2015 | Ana | B23D 45/04 |
| | | | | 83/471.3 |
| 9,056,402 B2 | * | 6/2015 | Clark | B27C 5/06 |
| 2002/0088327 A1 | * | 7/2002 | Young | B23D 45/044 |
| | | | | 83/477.1 |
| 2008/0277025 A1 | * | 11/2008 | Chang | B25H 1/14 |
| | | | | 144/287 |
| 2009/0095876 A1 | * | 4/2009 | Bergmann | B25H 1/10 |
| | | | | 248/676 |
| 2011/0232805 A1 | * | 9/2011 | DeSpain | B25H 1/14 |
| | | | | 144/285 |
| 2016/0243631 A1 | * | 8/2016 | Brewster | B27G 19/02 |
| 2016/0332321 A1 | * | 11/2016 | Chen | B27B 27/08 |
| 2017/0095867 A1 | * | 4/2017 | Hsu | B23D 47/025 |
| 2017/0106560 A1 | * | 4/2017 | Hsu | B23D 45/048 |

FOREIGN PATENT DOCUMENTS

| | | | | |
|---|---|---|---|---|
| DE | 3721820 C1 | * | 8/1988 | ........... B23Q 1/4866 |
| DE | 3721820 C1 | | 8/1988 | |
| GB | 2 406 539 A | | 4/2005 | |
| GB | 2406539 A | * | 4/2005 | ............... B25H 1/10 |

* cited by examiner

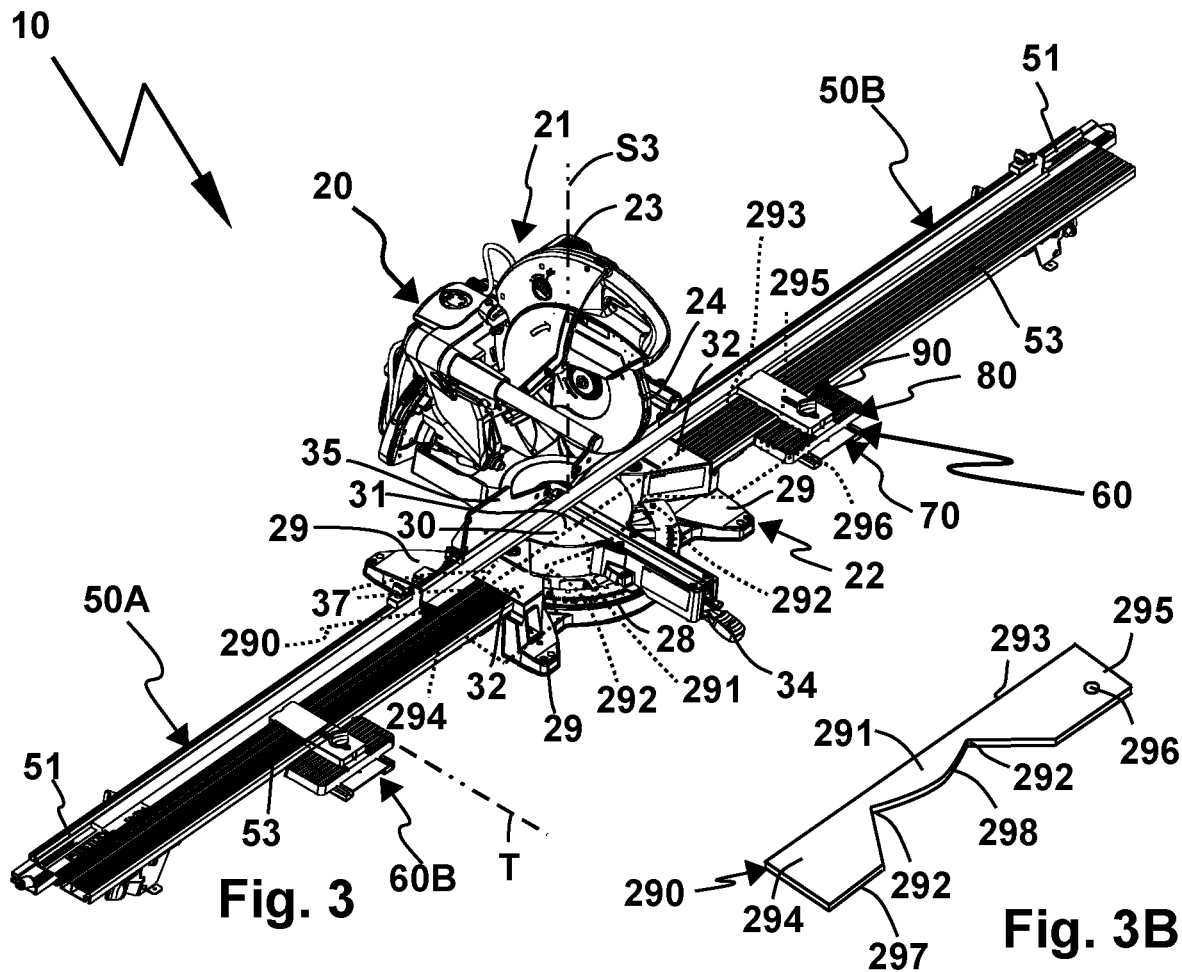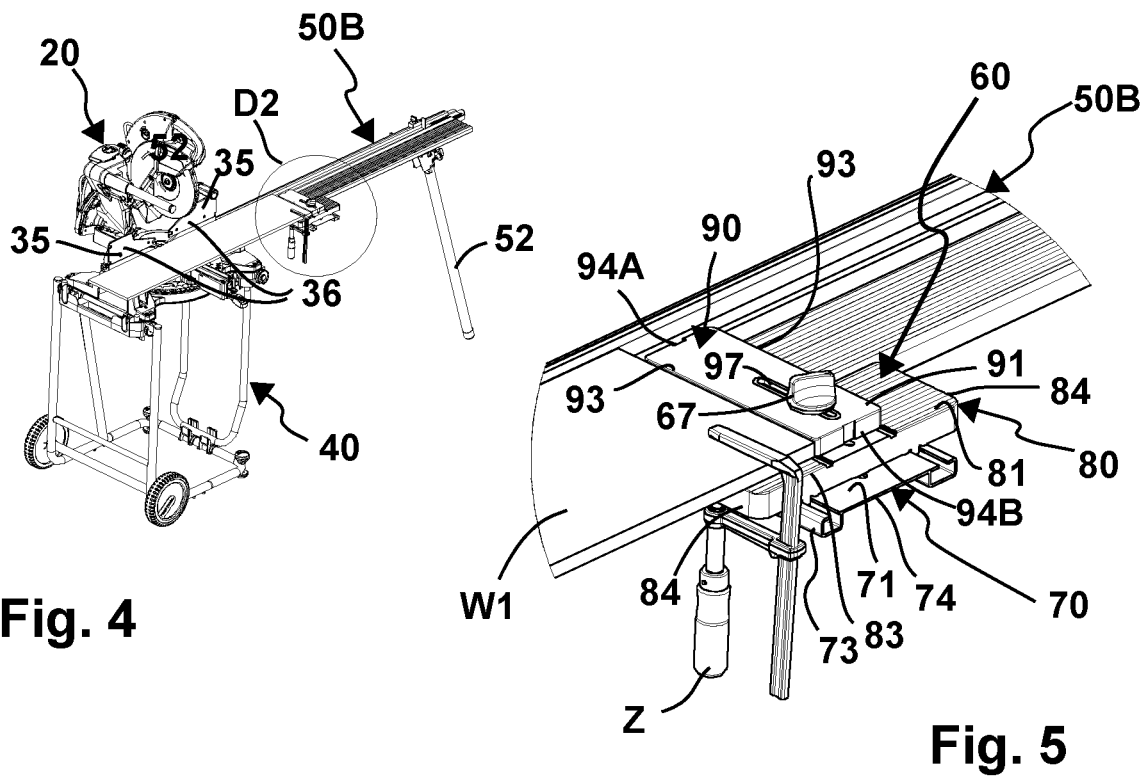

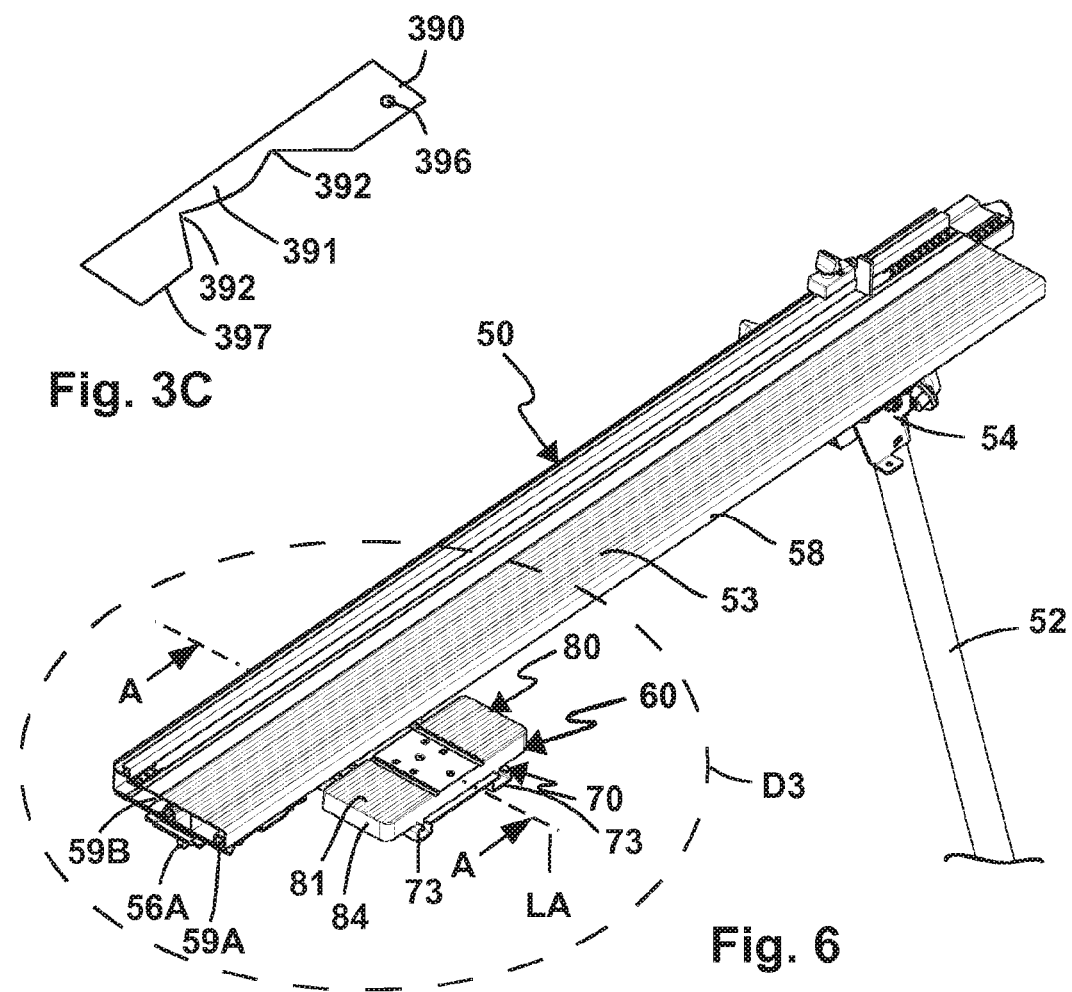
Fig. 3C
Fig. 6
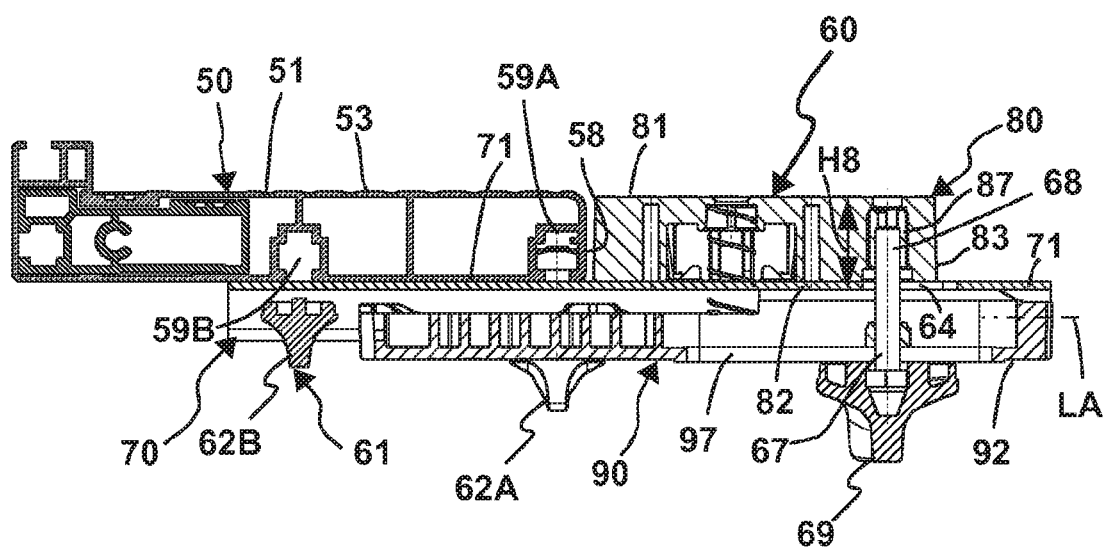
Fig. 7

SUPPLEMENTARY SUPPORT ASSEMBLY FOR A WORKPIECE SUPPORT ASSEMBLY

This application claims priority based on an International Application filed under the Patent Cooperation Treaty, PCT/EP2018/084523, filed Dec. 12, 2018, which claims priority to DE 102017130042.2, filed Dec. 14, 2017.

BACKGROUND OF THE INVENTION

The invention relates to a supplementary support assembly for a workpiece support assembly or as a component of a workpiece support assembly of a semi-stationary machine tool, in particular a machine saw, wherein a workpiece support body of the workpiece support assembly has a base supporting surface which is substantially horizontal in use for supporting a workpiece for machining, in particular for sawing, by a tool of the machine tool, wherein the supplementary support assembly has an supplementary supporting surface and a support body with support body mounting means for detachable mounting on the workpiece support assembly wherein when the supplementary support assembly is mounted on the workpiece support assembly, the supplementary supporting surface is at least substantially aligned with the base supporting surface.

The applicant is presenting a supplementary support assembly of this type. The supplementary support assembly has an adapter plate, i.e. a support body that can be attached to the base body or the base frame of a cross-cut mitre saw. With a supplementary supporting surface, the support body enlarges the base supporting surface for the workpiece provided by the saw table of the mitre saw, for example. The supplementary support assembly also has an adjustable transverse stop body so that the workpiece can be placed not only on the supplementary supporting surface but also on a transverse stop face of the transverse stop body. The workpiece can thus be supported like a sandwich between, on the one hand, the transverse stop face of the supplementary support assemblies and, on the other hand, a vertically projecting stop face which is closer to the saw unit or the drive of the machine tool. The supplementary support assembly is particularly suitable for the processing of profile parts that can be installed in spaces, for example between a side wall and a ceiling of a room.

However, the known supplementary support assembly is not flexible enough for some applications.

SUMMARY OF THE INVENTION

It is therefore the object of the present invention to provide an improved supplementary support assembly.

To achieve the object, regarding a supplementary support assembly of the type initially mentioned, it is provided that it has a supporting body which, by means of a supporting body bearing having a sliding bearing and/or a pivoting bearing, is mounted on the support body to be movable between at least two different relative positions with respect to the base supporting surface and can be detachably fixed in the relative positions on the support body by means of supporting body fixing means, wherein the supporting body has the supplementary supporting surface and/or forms a mounting base for a transverse stop body which can be detachably mounted on the supporting body by means of stop body mounting means and has at least one transverse stop face which is at an angle to the supplementary supporting surface, in particular at a right angle thereto.

The invention also relates to a workpiece support assembly comprising a supplementary support assembly of the above type.

It is advantageous if the workpiece support assembly forms a supplementary assembly extending in particular transversely to a working direction of the tool of the machine tool for detachable mounting on the machine tool. For example, the workpiece support assembly can be mounted laterally next to or on a base frame of the machine tool and thus extends a workpiece support face of the machine tool.

The invention also relates to a machine tool, for example a machine saw, in particular a cross-cut mitre machine saw, comprising a workpiece support assembly as well as a supplementary support assembly according to any one of the preceding claims. The workpiece support assembly can form an integral part of the machine tool, e.g. it can be present on its base frame. However, it may also be a supplementary assembly which is attachable to the machine tool and/or detachably connectable to the machine tool.

For example, the supporting body is mounted so that it is pivotable and/or slidable in relation to the support body. This allows the supporting body to be brought into an optimum position in which the supplementary supporting surface is then favourably positioned relative to the base supporting surface. The supplementary support assembly thus enables an enlargement of the base supporting surface even without the transverse stop face or the transverse stop body, so that it can be used favourably for plate-like and strip-like workpieces, for example. If the transverse stop face is added, the above-mentioned cover strips, for example, can also be easily machined.

The transverse stop body can be adjusted relative to the workpiece support assembly due to the adjustability of the support body.

The supplementary supporting surface can be spaced relative to the base supporting surface in at least one relative position so that there is an intervening space between the two supporting surfaces. The workpiece can bridge this intervening space, for example, so that the "gap" in the supporting surface is not decisive.

The supplementary supporting surface and the base supporting surface are at least substantially aligned with each other. It is possible that the supplementary supporting surface is slightly below or above a level, for example a horizontal level, of the base supporting surface, e.g. slightly under-mounted. A workpiece resting on the base supporting surface can also rest flat or substantially flat on the supplementary supporting surface.

The supplementary supporting surface and the base supporting surface are preferably flat or even surfaces. In this connection, it is possible for ribs or ribbing to be provided on the supplementary supporting surface and/or the base supporting surface, wherein support surfaces or support contours of the supplementary supporting surface and the base supporting surface lie in one plane.

It may be provided that a transverse stop face forms part of the supporting body. For example, it has a raised section which provides a transverse stop face. A supporting body may be provided which has the supplementary supporting surface and at least one transverse stop face which is then at an angle to the supplementary supporting surface, for example at right angles thereto.

The transverse stop body can be undetachably connected to the supporting body, can be movable, for example by means of an appropriate bearing, but can also be removable from the supporting body. It is possible that the transverse stop body can be detachably connected to the supporting body in one or more, for example at least two, positions using the stop body fixing means.

The stop body fixing means include for example a clamping device and/or a screwing device and/or a locking device. A retaining screw or clamping screw for screwing the transverse stop body to the supporting body is advantageous, for example. However, the stop body fixing means may also include or have positive locking contours on the supporting body and on the transverse stop body for positive engagement with one another.

The supporting body itself and/or the transverse stop body may have several, in particular at least two, transverse stop faces, for example transverse stop faces which are at an angle to and/or spaced apart from one another.

The transverse stop body is advantageously movably mounted on the supporting body by means of a transverse stop bearing, wherein the transverse stop bearing comprises a pivoting bearing and/or a sliding bearing. A combined pivoting and sliding bearing is also easily possible. In addition, the transverse stop body can be detachably mounted in relation to the supporting body using the transverse stop mounting means. In this way the transverse stop body can be moved along the supporting body and firmly connected with the transverse stop body mounting means, for example clamping means, locking means, screwing means or similar. The movability of the transverse stop body relative to the supporting body enables the setting of a plurality of positions of the transverse stop face relative to the base supporting surface for the workpiece.

The transverse stop bearing advantageously has a first guide component arranged on the supporting body and a second guide component arranged on the transverse stop body, one of which is a guide seat into which a guide projection of the other guide component engages and upon which the guide projection is guided. The guide seat is configured, for example, as a guide slot, guide link, guide contour or the like, or comprises one or more of these. The guide seat can, for example, be a longitudinal holder or an elongated guide seat, but may also have a curved shape.

At least one guide component advantageously forms or comprises a clamping body or clamp body, for example a clamping bolt, the stop body fixing means, wherein the transverse stop body can be clamped to the supporting body by means of the clamping body. The clamping body can be adjusted between a release position, in which the transverse stop body can be adjusted relative to the supporting body, and a fixing or clamping position, for example screwed, in which the transverse stop body is fixed to the supporting body. An alternative formulation provides that the stop body fixing means comprises at least one clamping body, for example a clamping bolt, clamp bolt or the like, which engages in or penetrates a guide seat in a transverse stop body or the supporting body and with which the transverse stop body can be clamped to the supporting body.

The guide seat advantageously has a longitudinal shape and/or is straight. The guide projection is advantageously mounted longitudinally displaceably along a sliding axis or longitudinal axis in the guide seat. The guide projection can, for example, be the previously mentioned clamping body or be formed by the clamping body.

The guide projection can be rotatably mounted on the guide seat. This means that the guide seat, even if it has a longitudinal shape and/or runs in a straight line, can simultaneously form a pivoting bearing receptacle. The guide projection, for example a screw bolt or the like, passes through a guide slot or a guide groove which has a longitudinal shape.

The guide seat may extend transversely or parallel to at least one transverse stop face of the transverse stop body. The transverse stop body may have several transverse stop faces, for example at least two transverse stop faces at an angle to each other. By adjusting the transverse stop body along the guide seat, it is possible to adjust the transverse stop face e.g. parallel to the longitudinal axis of the guide seat or transverse to the longitudinal axis of the guide seat.

The guide seat extends advantageously between opposite transverse stop faces of the transverse stop body. The transverse stop faces preferably run parallel to each other, while the guide seat is perpendicular to the transverse stop faces. By this measure it is possible to adjust the transverse stop face along the sliding axis of the guide seat with respect to the supporting body. An embodiment shown in the drawing provides, for example, that the guide seat extends parallel to one, preferably two, opposite sides of the transverse stop faces provided with a transverse stop body. This guide seat also runs between transverse stop faces which connect the above-mentioned parallel transverse stop faces with one another.

The guide seat can be provided centrally or centrically on the transverse stop body. However, an asymmetrical arrangement is also advantageous. For example, it is possible for a guide seat to run parallel to transverse stop faces, but to have a smaller distance to one transverse stop face than to the other transverse stop face.

It is advantageous if a bearing of the transverse stop body on the supporting body and of the supporting body on the support body provides two or more degrees of freedom of movement differing from one another. It is particularly advantageous if the transverse stop bearing and the supporting body bearing are, for example, sliding bearings whose displacement axes or sliding axis are at an angle to one another, for example at right angles.

An embodiment may provide that the supporting body and the transverse stop body are mounted in the manner of a compound slide rest with respect to the support body and/or are arranged or can be arranged in a circle.

A preferred embodiment provides that the guide seat extends between transverse stop faces provided on opposite sides of the transverse stop body, wherein the guide seat is spaced further from one transverse stop face than from the other transverse stop face. If the guide projection is rotatable relative to the guide seat, the transverse stop body can be rotated by 180°, for example, so that the transverse stop face can be advanced further in front of the guide projection in one rotational position than in the other rotational position.

The telescopic mounting of the transverse stop body with respect to the support body by means of the supporting body with respect to at least one telescopic axle is an advantageous embodiment. Therefore, the transverse stop body and the supporting body are telescope parts of such a telescope.

It is advantageous that the transverse stop body is displaceable in relation to the supporting body by means of the transverse stop body and is pivotally mounted by means of a pivoting bearing, wherein these bearings can be separate bearings or can be formed by a combined pivoting-sliding bearing. Different, particularly mutually angled, transverse stop faces can be positioned relative to the tool by means of the pivoting bearing. The sliding bearing advantageously forms a component of the aforementioned telescope.

The supporting body fixing means and the stop body fixing means may have common components. It is also possible that the supporting body fixing means is fully or partially formed by the stop body fixing means.

At least one retaining body and/or one actuating element of the stop body fixing means, in particular a clamp body, serves advantageously to fix the supporting body with respect to the support body. For example, an axle element or axle beam of the retaining body penetrates the supporting body. An actuating element or an actuating handle can be arranged on the axle beam.

It is preferable if the supporting body can be clamped in a sandwich-like manner between the support body and the transverse stop body. Thus, if the transverse stop body is fixed in relation to the support body, it simultaneously clamps the supporting body to the support body.

A width of the transverse stop body is advantageously smaller than a width of the supporting body.

A length of the transverse stop body is also advantageously smaller than a length of the supporting body.

It is therefore possible that the transverse stop body is brought into a position in which it does not project in front of the supporting body. However, it should be noted at this point that the transverse stop body can also have the same circumferential geometry as the supporting body.

It is preferably provided that the supplementary supporting surface of the supporting body protrudes laterally on at least one side, preferably on opposite sides, in the sense of an enlargement of an overall supporting surface formed by the basic supporting surface and the supplementary supporting surface in front of the support body. Consequently, the support body forms the basis, so to speak, for the supporting body, which then protrudes laterally on one or more sides in front of the support body and provides a particularly large base supporting surface.

It should also be mentioned at this point that the transverse stop body can also project in front of the support body, for example in one or more relative positions of the transverse stop body to the supporting body.

It is preferable if the supplementary support assembly can be arranged, for example, it can be mounted, on the workpiece support assembly by means of the support body mounting means in a transport position of a use position. A support section of the support body for supporting the supporting body projects further in front of the workpiece support assembly in the use position than in the transport position. This means that the supplementary support assembly does not interfere in the transport position, or in any case not as much.

The support body mounting means advantageously has at least one bearing component, for example a guide slot and/or a bearing seat of a transport bearing, by means of which the support body is mounted so as to be movable between the transport position and the use position with respect to the workpiece support assembly. The transport bearing has, for example, a sliding bearing and/or a pivoting bearing. In this way, the supplementary support assembly can be pivoted and/or displaced in relation to the workpiece support assembly, in particular the workpiece support body, in order to reach the transport position or the use position. At this point it should also be mentioned that a detachable mounting of the support body of the workpiece support assembly can also provide at least two assembly positions, namely one assembly position assigned to the transport position and one assembly position assigned to the use position. This means that a transport bearing does not necessarily have to be provided.

As already explained in connection with the transverse stop bearing, bearing components of a bearing, for example the transport bearing, can simultaneously have a clamping function, retaining function or similar. For example, the transport bearing can have a guide seat or guide slot which is penetrated by a mounting bolt or clamping body. The mounting bolt or mounting body can be detachably connected to the workpiece support assembly, e.g. screwed into it, clamped to it or the like. For example, a clamping screw can simultaneously form a cam follower or a guide projection which engages in a guide seat of the transport bearing. Furthermore, the transport bearing may have a bore or other pivoting bearing opening which is penetrated by a pivoting bearing body which is connected to the workpiece support assembly, for example screwed into it.

At least one component of the supplementary support assembly, for example the transverse stop body, advantageously forms a fixing device for fixing at least one component of the workpiece support assembly in a position suitable for transport on the workpiece support body. The supplementary support assembly, for example the transverse stop body, the supporting body or the like, thus additionally forms a holder or a retaining component in order to fix a component or a component of the workpiece support assembly with respect to the workpiece support body. This at least one component can, for example, be a support, in particular a telescopic support, a pivoting support, a support foot or the like for supporting the workpiece support body, which is fixed or fixable by the component of the supplementary support assembly, for example the transverse stop body, in a position resting on the workpiece support body. For example, the component of the supplementary support assembly can be pivoted towards the workpiece support body, in which position it can then be fixed by the supplementary support assembly.

The supporting body bearing advantageously has two guide seats running parallel to a sliding axis of the supporting body and spaced transversely to the sliding axis, for example guide grooves, dovetail grooves or the like, in which guide projections are guided parallel to the sliding axis. In this connection, it is possible to have both guide seats on the supporting body and both guide projections on the transverse stop body. However, it is also possible that the guide seats are located on the supporting body and the guide projections on the support body. Furthermore, it is possible that the supporting body has only one guide seat and only one guide projection, which are intended for engagement with a guide projection or guide seat of the support body.

The guide seat and guide projection pairs are advantageously arranged on opposite longitudinal side regions, especially on longer side regions and/or on edge regions of the support body. Thus the support body supports or guides the supporting body as far out as possible.

The supporting body fixing means advantageously has at least one clamp body, which can be clamped with one of the guide seats. The clamp body is arranged, for example, as a cam follower or guide projection in the guide seat.

It is also advantageous if the supporting body fixing means has at least one rear engagement contour, for example a hook contour or the like, which can be brought into a rear engagement with one of the guide seats so that the supporting body is held on the guide seat on all sides transverse to the sliding axis. The supporting body can thus be moved along the guide seat or the linear axis, but can no longer be removed from the guide seat at right angles.

The supporting body fixing means advantageously has a clamp body and/or a rear engagement contour for each of the guide seats.

It should be mentioned at this point that the clamp body can have an integral rear engagement contour. The clamp body can be the only clamp body which engages in both of the guide seats, furthermore the clamp body can engage in both of the guide seats as a rear engagement contour. The rear engagement contours are advantageously turned away from each other and/or in a splayed manner.

For example, a guide seat may have a section projecting into a groove or slot as a rear engagement contour, which is engaged from the rear by the rear engagement body or the rear engagement contour.

A guide projection or several guide projections, which engage in the guide seat, can be provided on the supporting body. For example, the guide projections have a distance in relation to the longitudinal axis or sliding axis of the guide seat. The guide projections on opposite sides of the support body are preferred.

The support body and/or the workpiece support body are advantageously designed as a profile body or as an extruded profile.

For example, when designed as a profile body or extruded profile, the following measure can be advantageously implemented:

The support body and/or the workpiece support body advantageously have a guide seat with a retaining contour, e.g. a projecting section for rear engagement by a rear engagement contour and/or a sliding block. Therefore, the guide seat is also a retaining receptacle. The guide seat can simultaneously form a clamping receptacle with which a clamp body can be clamped.

The supporting body, the support body and the transverse stop body can be plate-like, for example. The supporting body and the transverse stop body are advantageously made of plastic, while the support body is made of metal.

The supplementary support assembly is advantageously provided and/or designed for assembly on a longitudinal side, for example on a longitudinal narrow side or a longer side, of the workpiece support assembly. The longitudinal narrow side is provided on the workpiece support body, for example. The longitudinal side runs along a longitudinal extension of the workpiece support assembly and is longer than a transverse side, for example a longitudinal end side, of the workpiece support assembly.

The support body and/or supporting body and/or the transverse stop body advantageously have at least one passage opening for a screw, which can be screwed through the supporting body or transverse stop body into a workpiece. An outlet of the opening for the screw is provided, for example, at the supplementary supporting surface of the support body or a transverse stop face of the transverse stop body. The opening extends, for example, from the respective support surface or stop surface to a side of the support body or transverse stop body opposite to the support surface or stop surface. An optional embodiment provides for the supporting body to have at least two openings for screws, wherein the supporting body bearing is advantageously located between these openings.

The support body and/or supporting body and/or the transverse stop body advantageously have at least one retaining receptacle for a retaining body screwed into the workpiece or a support for the workpiece, in particular for a screw head.

The supporting body and/or the transverse stop body are preferably components detachable from the support body.

The stop body fixing means and/or the supporting body fixing means may advantageously include a clamping device, a locking device, a screw device or the like. If such fixing means are detached, the supporting body and/or the transverse stop body can be removed from the support body. In particular, it is possible that a support body for supporting a workpiece is connected, in particular screwed, to, for example, the transverse stop body and/or the supporting body, for which, for example, the above-mentioned retaining receptacle and/or opening are suitable. The support body is for example a so-called spoil board or other wooden element, which can also be sawn through if necessary.

The supplementary support assembly may also advantageously have a transverse stop body or a template for the production of a transverse stop body which has a circumferential contour adapted to an outer circumferential contour, for example a side contour or a front contour, of the machine tool. The outer circumferential contour of the transverse stop body has, for example, a recess, a curve or the like, so that the transverse stop body does not project or only slightly projects in front of a front side of the machine tool. For example, the transverse stop body is adapted to a circumferential contour of a saw table or machining table of the machine tool. The transverse stop body has a particularly elongated shape. The transverse stop body has one or more transverse stop faces which, in the use position, are at an angle, in particular at right angles, to the base supporting surface and/or supplementary supporting surface. It is advantageous if the circumferential contour adapted to the machine tool and the transverse stop face are provided on opposite sides, especially longitudinal sides, of the transverse stop body.

The transverse stop body can be provided in conjunction with the feature of an adapted circumferential contour or also without an adapted circumferential contour, for example with a straight, non-arc-shaped circumferential contour or the like, for the connection of the supplementary support assembly to a further supplementary support assembly which is for example designed in the same way as the supplementary support assembly. The transverse stop body thus extends, for example, from one supplementary support assembly to the other supplementary support assembly.

The machine tool and/or the workpiece support assembly advantageously has at least one transverse stop or transverse stop surface. The at least one transverse stop face of the supplementary support assembly can advantageously be adjustable to a position opposite to the transverse stop face of the machine tool or workpiece support assembly.

A configuration is preferable in such a way that two supplementary support assemblies are provided whose transverse stop body and/or supporting body is removable from the support body. A supplementary support assembly, for example a strip of wood or other elongated wooden element, can be connected to the transverse stop body and/or the support body, for example screwed, hooked or the like. An elongated support body, for example the aforementioned strip of wood, can, so to speak, form a connecting element between two supporting bodies and/or two transverse stop bodies of two supplementary support assemblies. The supporting bodies or transverse stop bodies can be removed from the support body when connected to the support body and, if necessary, can be detachably mounted on the support body again.

An underside of the workpiece support assembly is advantageously used for the mounting of the support body. Naturally, the entire underside of the workpiece support assembly can be in the same plane or can be a flat surface. However, it is also possible that the workpiece support assembly has for example, a stepped or in any case not flat overall underside, the edge of which is the underside provided for the mounting of the support body.

It is advantageous if the support body has a support surface for supporting the supporting body which, when the support body is mounted on the workpiece support assembly, for example screwed to it or clamped to it, is flush with the underside of the workpiece support assembly provided for mounting the support body and/or lies flat or at least substantially flat against this underside. The underside of the workpiece support assembly and the supporting surface of the support body for the supporting body lie advantageously in a common plane.

For example, it is possible for the support body, when mounted on the workpiece support assembly, to project in front of the workpiece support assembly in the manner of a tray or a laterally projecting support. In this connection, it is possible that a support surface of the support body for the supporting body is aligned with the underside of the workpiece support assembly or lies in one plane, but also that the supporting surface of the support body lies above or below the plane of the underside of the workpiece support assembly.

The workpiece support assembly and the supporting body have expediently the same or approximately the same height and/or the same distance between their upper side provided for supporting a workpiece and a lower side opposite thereto, at least where the supporting body is arranged next to the workpiece support assembly in the assembled state.

For example, an edge region of the workpiece support assembly is the same height as the supporting body.

It is advantageously provided that a distance between the supplementary supporting surface and an underside of the supporting body is equal or substantially equal to a distance between the base supporting surface of the workpiece support assembly and an underside of the workpiece support assembly provided for the mounting of the support body, for example an edge region of the workpiece support assembly.

BRIEF DESCRIPTION OF THE DRAWINGS

An embodiment of the invention is explained below on the basis of the drawing. The following drawings show the following:

FIG. 6 a perspective oblique view of a workpiece support assembly with a supplementary support assembly, FIG. 7 a section through the arrangement as shown in FIG. 6, approximately along a section line A-A in FIG. 6, FIG. 8 a configuration similar to FIG. 3, but with a workpiece placed flat on the supplementary support assembly, FIG. 9 a partial view of the workpiece support assembly as shown in FIG. 6, corresponding approximately to a section D3 in FIG. 6, FIG. 10 a plan view of the inventive supplementary support assembly according to the invention, from which the following are shown in FIG. 11 a cross-section along a section line B-B in FIG. 10 and in FIG. 12 a cross-section along a section line C-C in FIG. 10, FIG. 13 a lower view of the workpiece support assembly as well as the supplementary support assembly, which is displaced into a transport position.

DETAILED DESCRIPTION

Figure 1:
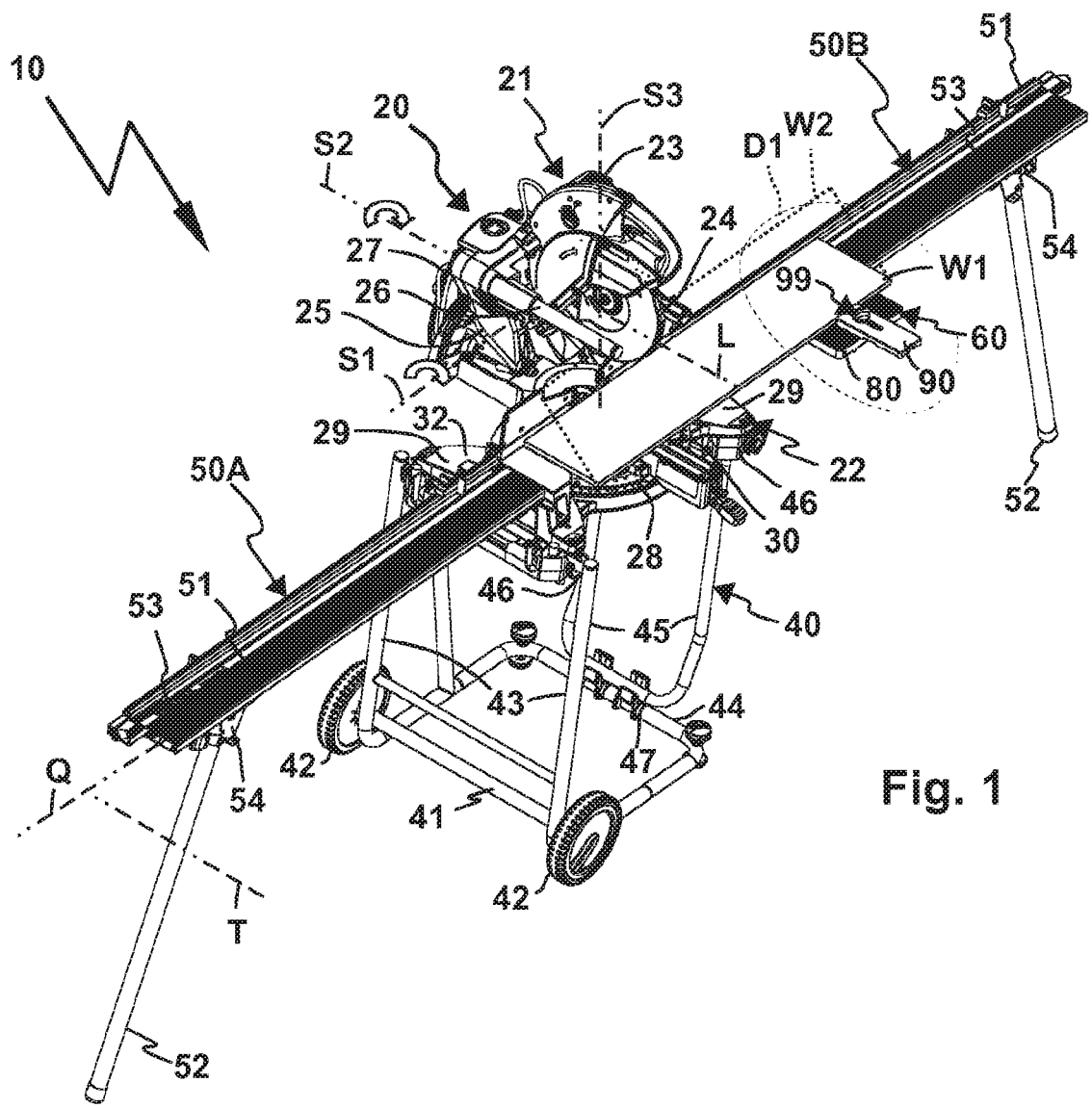
FIG. 1 a perspective oblique view, a semi-stationary machine tool with attached workpiece support assemblies arranged on a frame, and a supplementary support assembly, FIG. 2 a detail D1 from FIG. 1 with an enlarged view of the supplementary support assembly, FIG. 3 the arrangement shown in FIG. 1, but without the frame, FIG. 3B a transverse stop body used or usable with the arrangement shown in FIG. 3, FIG. 3C a template for the production of the transverse stop body as shown in FIG. 3B, FIG. 4 the arrangement shown in FIG. 1 with only one workpiece support assembly, FIG. 5 a detail D2 from FIG. 4.

For example, a semi-stationary machine tool 20 is designed as a machine saw. Machine tool 20 has a saw unit 21, which is movably mounted on a machine base 22. Saw unit 21 can be swivelled around one or more pivot axes with respect to machine base 22, for example around pivot axes S1 and/or S2 and/or S3.

Saw unit 21 has a drive motor 23, in particular an electric drive motor, with which a tool holder and thus a tool 24, for example a saw blade, can be driven.

Tool 24, preferably saw unit 21, is mounted relative to machine base 22 preferably displaceable along a linear axis L, so that the machine saw or machine tool 20 can be used as a pull saw. For example, longitudinal guides 26 are provided for adjusting saw unit 21, for example on elongated support bodies, pipes or the like, on which saw unit 21 is mounted so that it can be displaced along the linear axis L.

In addition, tool 24, i.e. the saw blade, can be pivoted about the pivot axis S1, which thus forms a depth adjusting axis S1, in the direction of a workpiece support surface 31 of a machining table 30 provided on machine base 22, in order to cut through a workpiece W1 or W2 resting on workpiece support surface 31.

Furthermore, saw unit 21 can be pivoted by means of an inclined bearing 27 around the pivot axis S2, which in this case forms an inclined axis S2. Tilt axis S2 and the linear axis L run parallel to one another. For example, tilt bearing 27 is arranged on machine base 22, in particular on a tower or beam projecting in front of it. Machining table 30 is pivotally mounted about the pivot axis S3, which forms a mitre axis S3, on a base support 28 of machine base 22, which can, for example, be placed on a base, see for example FIG. 3, or on a frame 40 (FIG. 1).

Mitre axis S3, tilt axis S2 and depth adjustment axis S1 run at right angles to one another. By pivoting saw unit 21 around the depth adjustment axis S2, a so-called chop cut can be made in the workpiece W1, W2, so that machine saw 20 can also be called a mitre saw. Due to the additional adjustability of saw unit 21 along the linear axis L, it is also a pull saw. Thus, a combined pull and mitre machine saw is shown in the drawing.

When machine tool 20 is in use, mitre axis S3 is vertical or essentially vertical, while depth adjustment axis S1 and tilt axis S2 are horizontal or essentially horizontal axes.

Wheels 42 are arranged on a frame base 41 of frame 40, so that it can be rolled on a base. Supports 43 as well as a stoppage projection 44 project from frame base 41 for parking on the ground. Support frame 45 is also supported on stoppage projection 44 by a bearing 47. Bearing 47 can provide a fixed support, but also a detachable mounting of support frame 45 on stoppage projection 44. Stoppage projection 44 and supports 43 are approximately at right angles to each other. Frame 40 can be stopped on wheels 42 as well as the stoppage projection 44 on a base. Mounting means 46 are provided at the free end regions of supports 43 and support frame 45 for mounting machine tool 20. For example, mounting means 46, which may be screws, clamps or other similar mountings, may be detachably connected to lateral supports 29 of machine base 22, in particular base support 28. Overall, the machine tool 20 placed on frame 40 enables comfortable working. For example, the workpiece support surface 31 is at approximately hip height of an operator.

Side support surfaces 32 are provided on side supports 29, which are aligned with workpiece support surface 31 of machining table 30, which forms a main workpiece support surface, or at most have a slight height offset. Thus, workpieces W1 and W2 can be placed on workpiece support surface 31 and simultaneously on side support surfaces 32.

Machining table 30 is arranged approximately centrally between four of the side supports 29.

Machining table 30 can be swivelled around the mitre axis S3 in relation to base support 28.

An operating arm or operating projection 33, which projects in front of machining table 30, is provided for handling, in particular pivoting, workpiece 30. Operating projection 33 can be grasped by an operator in order to pivot machining table 30 as a whole and thus saw unit 21 arranged on machining table 30 around the mitre axis S2. The set mitre position can be determined by means of a retaining device 34, for example a clamping device and/or locking device. Only one actuating element of the retaining device 34 on operating projection 33 is marked in the drawing with reference 34.

Consequently, machine tool 20 allows a highly flexible adjustment of the respective position of tool 24 or saw blade in relation to workpiece support surface 31 in order to machine, in particular saw, workpieces W1, W2 or other, unspecified workpieces.

At this point it should be mentioned only as an example that the adjustability of machine tool 20 is naturally also suitable for other machining methods, for example for milling, drilling or the like. In any event, machine tool 20 is a semi-stationary machine tool that can be taken to a construction site and set up on-site there, i.e. it can be placed directly on the ground or in an ergonomically favourable position using frame 40.

In both operating modes, namely with and without frame 40, workpiece support assemblies 50, for example workpiece support assemblies 50A and 50B according to FIG. 1 or only one of the two workpiece support assemblies 50A or 50B (FIG. 7), are favourable for machining workpieces W1, W2.

Workpiece support assemblies 50A, 50B extend workpiece support surface 31 of machining table 30 with respect to a longitudinal axis Q, which extends transversely to the linear axis L. Longitudinal axis Q is also parallel to an axis of rotation of tool 24 or the tool holder driven by drive motor 23. Longitudinal axis Q thus runs transverse to a working direction of tool 24 during a machining of workpiece W1, W2, for example, if the workpiece is moved along the linear axis L and/or a saw cut SX is made in the workpiece W1 or W2. Furthermore, the longitudinal axis Q is parallel to the depth adjustment axis S1.

By means of the extension or widening of workpiece support surface 31 not only by side support surfaces 32, but also by workpiece support assembly 50 with respect to the longitudinal axis Q, elongated workpieces W1, W2 can be placed on workpiece support surface 31 as well as workpiece support assembly 50 and can be conveniently and effectively machined by system 10 comprising machine tool 20 and one or both of workpiece support assemblies 50.

Workpiece support assemblies 50A, 50B each have a workpiece support body 51, on the upper side of which a base supporting surface 53 is provided to support the workpieces W1, W2. Base supporting surface 53 is aligned with workpiece support surface 31 of the machining table 30 and side support surfaces 32 when workpiece support assemblies 50 are attached to machine tool 20, especially base support 28.

Workpiece support assembly 50 also has supports 52 which, in the position shown in FIG. 1, support workpiece support bodies 51 in the region of their longitudinal ends remote from machine base 22 or machine tool 20 as a whole. A length of supports 52 is dimensioned so that it corresponds approximately to the length of the supports 43. Supports 52 can be telescopic. Supports 52 are pivotably mounted in relation to workpiece support bodies 51 on bearings 54, in particular pivoting bearings, so that they can be moved from the position of use shown in FIG. 1 to a transport position in which they rest against an underside 55 of workpiece support bodies 51. Supports 52 can, for example, pivot around a pivot axis SX of the respective bearing 54.

Mounting means for mounting on machine tool 20 are provided at longitudinal end regions of workpiece support bodies 51 provided for connection to machine tool 20, for example positive locking contours, clamping means or the like. For example, retaining contours 56, in particular retaining contours 56 angled to each other, are provided on workpiece support body 51, especially its underside, which can be brought into engagement with retaining contours 37 of machine base 22. Retaining contours 56 are positively complementary to retaining contours 37. Retaining contours 56 are positively complementary to retaining contours 37. Retaining body 56A, for example, can be adjusted between a release position and a clamping position using a clamping screw 57. In the release position the retaining contours 37, 56 can be disengaged, while in the clamped position they are clamped together and engage positively in each other.

Thus, in any case, workpiece support assemblies 50A, 50B can be firmly connected to machine tool 20, in particular machine base 22, such that base supporting surface 53 is held in position with respect to workpiece support surface 31.

Workpiece support assembly 50 has a relatively narrow base supporting surface 53 extending along the longitudinal axis Q, which extends only slightly transversely to the longitudinal axis Q in a depth direction T, i.e. runs narrowly along the longitudinal axis Q. Thus, if a workpiece of the type of workpiece W1, for example, is to be placed on base supporting surface 53, it will project, for example, against a vertical stop or transverse stop 35 of the machine tool 20 and will project in front of workpiece support body 51 on a side remote from transverse stop 35, in particular its transverse stop face 36, i.e. in relation to the longitudinal or linear axis L. Thus, although workpiece W1 is substantially supported by workpiece support body 51, in the region of operating projection 33 of machining table 30, it is only supported by machining table 30. Tool 24 is opposite machining table 30 and operating projection 33, so that there is sufficient support for workpiece W1, W2. However, workpiece W1, W2 can warp if it is not fully supported with respect to the linear axis L, e.g. if it protrudes in front of the workpiece support assemblies 50A and 50B in the depth direction T, as shown in FIG. 1.

This is remedied by the following detailed description of supplementary support assembly 60 (several supplementary support assemblies 60 can also be used).

Supplementary support assembly 60 supports workpiece W1, W2 laterally next to machine tool 20 and laterally next to machining table 30 in addition to workpiece support body 51. Supplementary support assembly 60 comprises a support body 70 which can be detachably mounted on workpiece support assembly 55 by means of support body mounting means 61, and a supporting body 80 which is movably mounted on support body 70 and can be detachably connected to support body 70 and which increases base supporting surface 53 of workpiece support assembly 50 in the depth direction T and/or transversely to the longitudinal axis Q with a supplementary supporting surface 81.

A transverse stop body 90 can be detachably attached to supporting body 80.

In addition, the components of the supplementary support assembly 60 are adjustable relative to each other and supplementary support assembly 60 is adjustable in relation to workpiece support assembly 50. For example, support body 70 can be adjusted between a use position G shown in FIG. 14 and a transport position TS shown in FIG. 13 using a transport bearing 75.

Supporting body 80 can be adjusted relative to support body 70 by means of a supporting body bearing 85, so that it and thus supplementary supporting surface 81 can have different distances to the base supporting surface.

Figure 2:
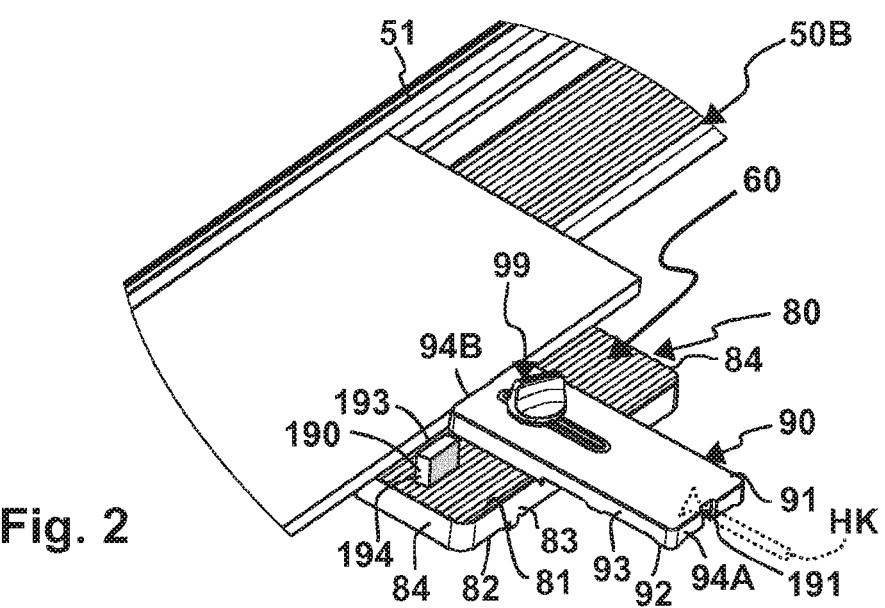
Figure 8:
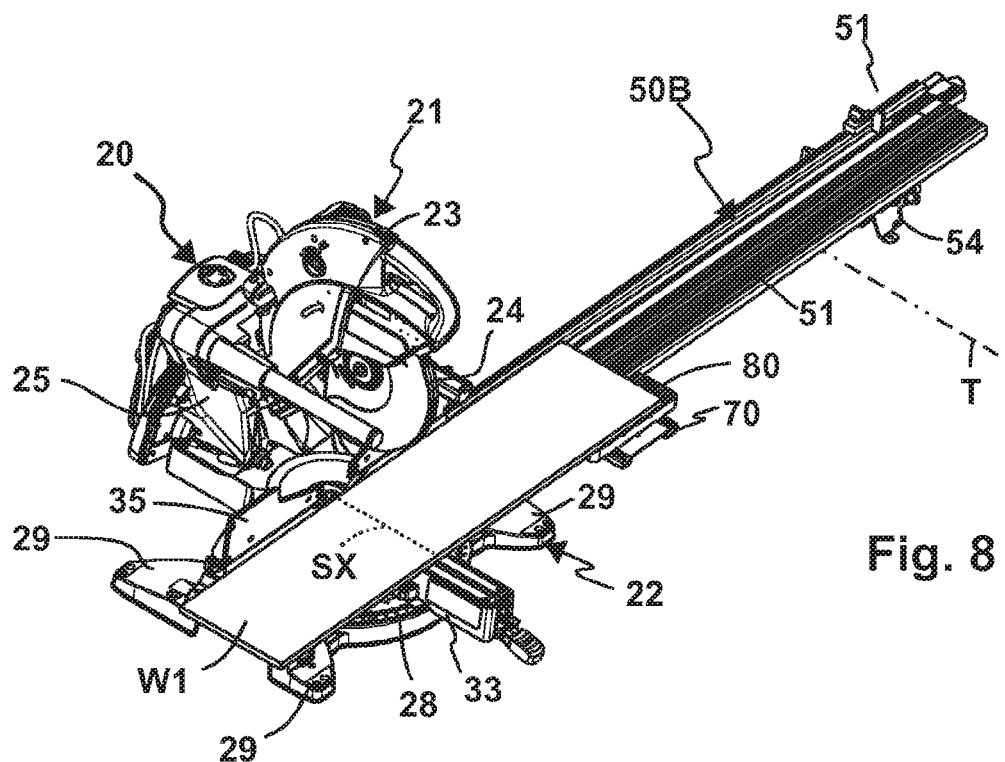
Figure 9:
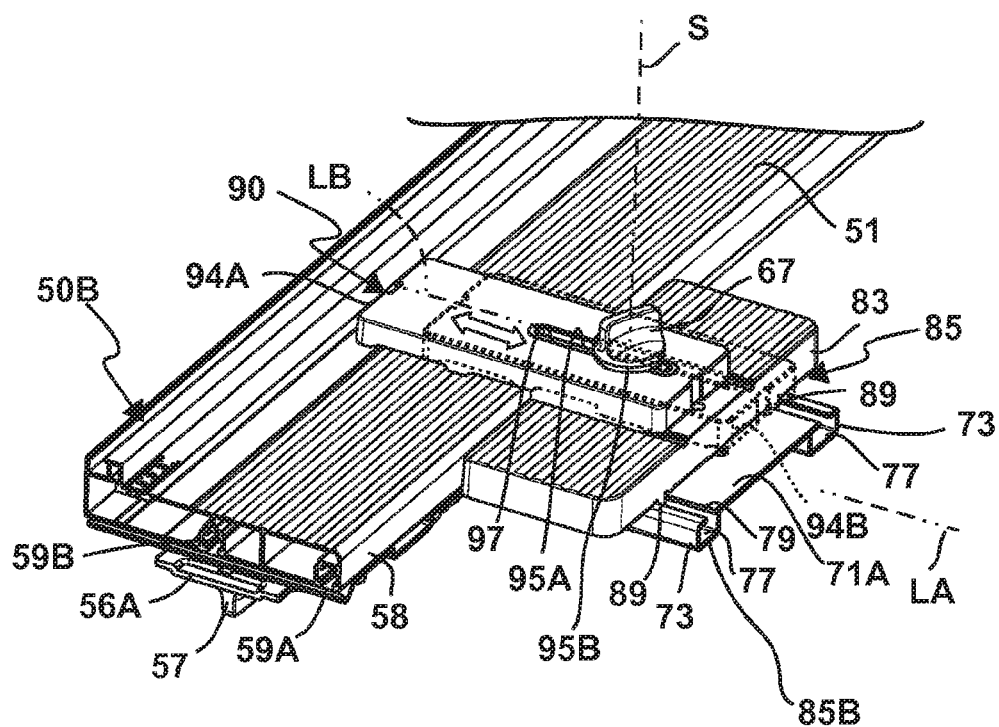
Figure 10:
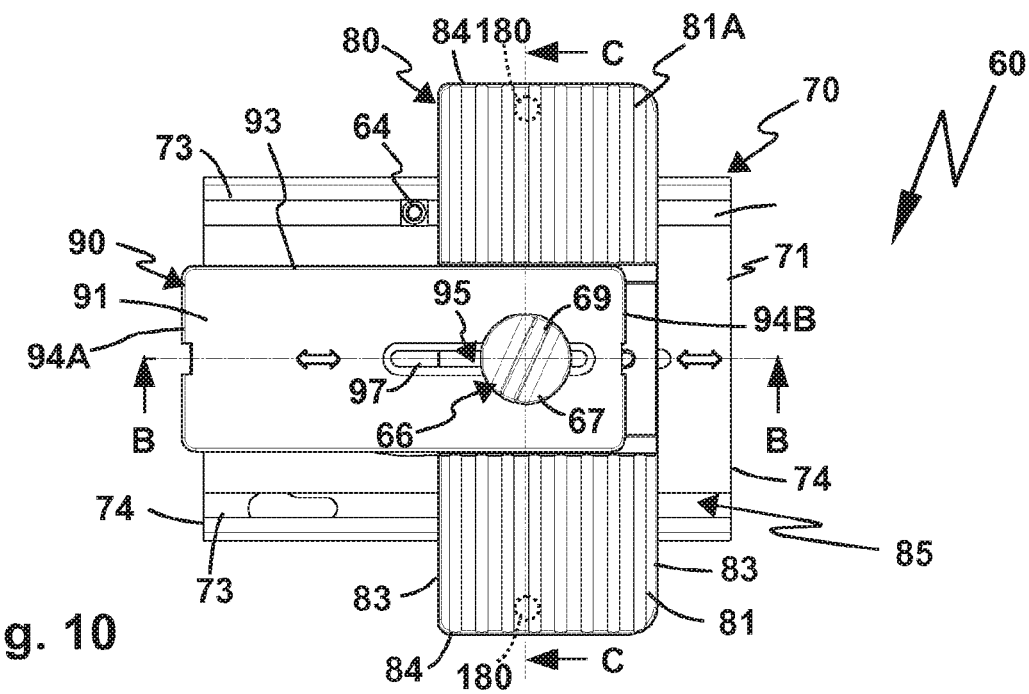
Figure 11:
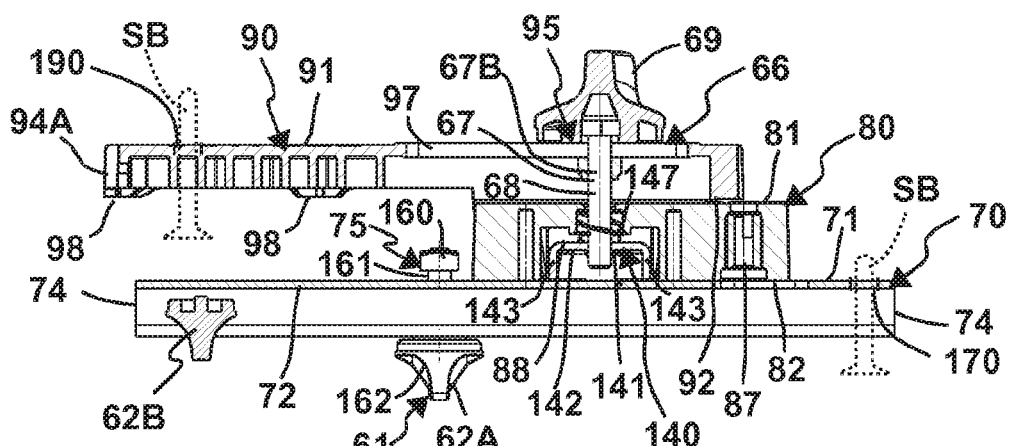

Transverse stop body 90 can be adjusted in relation to supporting body 80 by means of a transverse stop 95, so that it can be adjusted, for example, between the positions shown in FIGS. 2 and 3 and other positions that result from the bearing concept of transverse stop 95.

Support body 70 is configured as a profile body. Support body 70 has a support surface 71 for the supporting body 80. Support surface 71 and a bottom surface 72 of support body 70 are provided on opposite sides of support body 70. Support surface 71 and bottom surface 72 are provided, for example, on a wall body or wall section 76 of support body 70.

Wall body 76 is arranged between guide sections 73 of support body 70. Guide sections 73 each have a guide seat 77 of supporting body bearing 85. Guide seats 77 extend between longitudinal end regions 74 of support body 70, advantageously over its entire length.

Supporting body 80 is substantially plate-like. Its upper surface or upper side in FIGS. 1 and 2, for example, has the supplementary supporting surface 81. Supplementary supporting surface 81 can have a ribbed structure 81A, so that workpiece W1, W2 does not lie flat on supporting body 80, but in a linear or punctiform manner. Opposite supporting surface 81 there is a support side 82, which is intended for support on supporting surface 71 of support body 70.

In plan view of supplementary supporting surface 81, supporting body 80 has an essentially rectangular contour with long narrow sides 83 and shorter narrow sides 84, which extend between the long narrow sides 83.

A height H8 of supporting body 80, i.e. a distance between supplementary support surface 81 and support side 82 and/or a distance between the supplementary supporting surface 81 and the supporting surface 71 of the support body 70, is dimensioned in such a way that the supplementary support surface 81 on the workpiece support assembly 50 is aligned or substantially aligned with the base supporting surface 53 when the supplementary support assembly 60 is assembled (FIGS. 6 and 7).

In principle, the transverse stop body 90 is also suitable for supporting workpieces by providing a support side 91. Opposite the supporting side 91 is a support side 92, which is intended for support on the supporting body 80, in particular its supplementary supporting surface 81.

Transverse stop body 90 is plate-like. Transverse stop body 90 also has a rectangular shape in plan view of the supporting side 91 with long transverse stop faces 93 and shorter transverse stop faces 94. Transverse stop faces 93, 94 are provided on the narrow sides of the transverse stop body 90. Transverse stop body 90 can be adjusted in several positions relative to supporting body 80 with the aid of transverse stop bearing 95, so that transverse stop faces 93 and 94 can optionally be used as transverse stop faces for workpieces W1, W2.

Supplementary support assembly 60, in particular support body 70, can be detachably connected to workpiece support assembly 50 by means of support body mounting means 61.

In this connection, it is possible, for example, that screws, for example in the type of clamping bodies or connectors 62A, 62B, which penetrate support body 70, are screwed into corresponding screw holders 262 (FIG. 13) on workpiece support assembly 50. It is thus possible to detachably attach supplementary support assembly 60 to workpiece support assembly 50 at one or more points and to remove it again, for example by loosening connectors 62A, 62B. Further screw holders 262 can be provided at different points of workpiece support assembly 50, so that supplementary support assembly 60 can be attached to the workpiece support assembly 50 in different positions.

Clamp bodies or connectors 62A, 62B each have an operating handle 162, for example a rotary knob or operating knob, an axle body 161.

However, the following concept is provided for the adjustability of the supplementary support assembly 60 with respect to the workpiece support assembly 50, in which connectors 62A and 62B have a counter-bearing body 160, which is displaceably mounted on workpiece support assembly 50 in a release position of connectors 62A, 62B. Axle beam 161 can be screwed into the counter-bearing body 160 using the operating handle 162, so that the clamping function of a respective connector 62A, 62B can be realised. By a screw actuation of a respective operating handle 162, the distance between operating handle 162 and counter-bearing body 160 is increased according to a release of a jam or reduced according to a production of a jam.

For example, the respective counter-bearing body 160 engages in longitudinal grooves 59A, 59B of workpiece support assembly 50. Longitudinal grooves 59A, 59B are provided on the side of the workpiece support body 51 opposite base supporting surface 53, e.g. underside 55. Longitudinal grooves 59A, 59B run along the longitudinal axis Q, parallel to a longitudinal narrow side or longitudinal side 58 of workpiece support body 51. Longitudinal grooves 59A, 59B form bearing grooves of an adjustable bearing 65, by means of which supplementary support assembly 60 can be adjusted between at least two different use positions relative to workpiece support body 51, in each of which supplementary supporting surface 81 is available for supporting a workpiece W. The positioning bearing 65 allows the entire supplementary support assembly 60 to be adjusted in the direction of the longitudinal axis Q or in the longitudinal extension of workpiece support body 51. Counter-bearing bodies 160 slide along in the longitudinal grooves 59A, 59B.

Support body mounting means 61 also include bearing components 75A, 75B of transport bearing 75 for the adjustment of supplementary support assembly 60 between transport position TS and use position G. The connectors or retaining screws 62A, 62B, in particular the axle beams 161 thereof, form bearing components 75A, for example.

Connector 62A passes through a bearing seat 64, connector 62B through a guide link 63 of support body 70. Guide link 63 and the bearing seat 64 form bearing components 75B of the transport bearing 75. Guide slot 63 extends in an arc around bearing seat 64. Support body 70 can consequently be pivoted as a whole around a bearing axis which is determined by axle beam 161 of clamp body 62A or which passes vertically through bearing seat 64.

It can be seen that bearing seat 64 and guide link 63 in the present embodiment are in principle a component of a pivoting bearing.

Figures 13, 14:
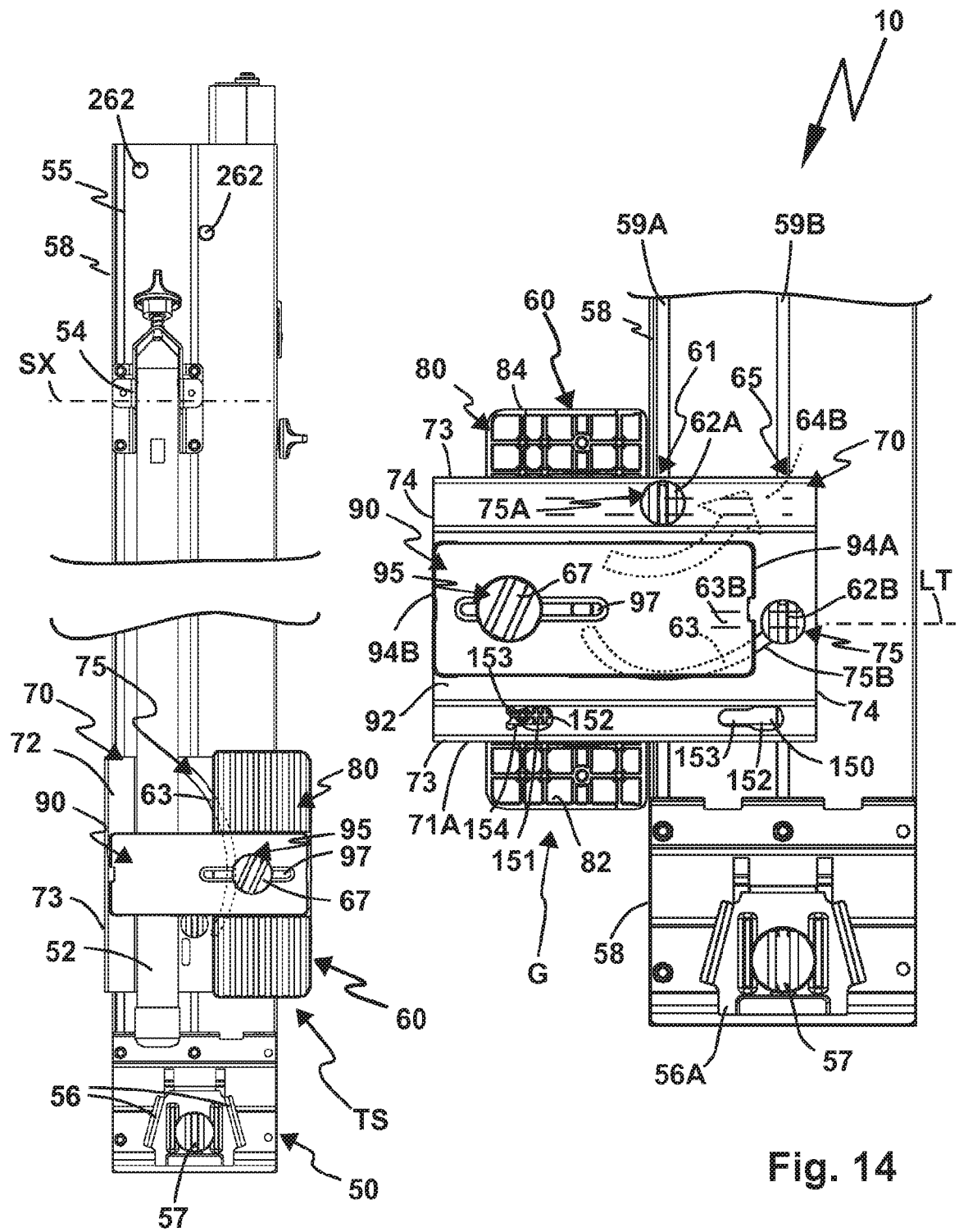
FIG. 14 shows a lower view of the workpiece support assembly and the supplementary support assembly, approximately corresponding to the section in FIG. 9.

If guide link 63 had a straight line as shown in the drawing, a linear adjustment would be possible. By way of example, FIG. 14 shows guide links 64B and 63B, which can be penetrated by clamping bodies or connectors 62A, 62B and can be arranged on support body 70, thus enabling linear adjustment of support body 70 with respect to workpiece support body 51 around a linear axis LT.

In both scenarios, i.e. if transport bearing 75 is configured as a pivoting bearing with, for example, guide link 63 or as a sliding bearing with, for example, guide supports or guide links 63B, 64B, it is possible to adjust support body 70 and thus supplementary support assembly 60 as a whole between transport position TS and use position G.

In use position G, a support section 71A of the supporting surface 71 protrudes in front of the workpiece support body 51 such that supporting body 80 can be supported there. However, in this connection, the supporting body 80 cannot only be fixed or arranged in a single position in relation to the support body 70, but in several positions along a linear axis LA.

Supporting body fixing means 66 for fixing supporting body 60 with respect to the support body 70 as well as stop body fixing means 99 for fixing the transverse stop body 90 with respect to support body 70 and/or supporting body 80 have partially similar or identical components.

For example, a retaining body 67, in particular a retaining screw, is a component of both fixing means 66, 99. Retaining body 67 comprises an axle beam 67, at the free end region of which an operating handle 69, for example an operating knob, is provided. Retaining body 67 can be rotated on operating handle 69.

Retaining body 67 has a screw section at its end region opposite to operating handle 69, so that it can, for example, be screwed into a clamp body 140 with which transverse stop body 90 can be clamped with respect to support body 70, wherein supporting body 80 is clamped between support body 70 and transverse stop body 90 like a sandwich.

Clamp body 140 is accommodated in a clamp body receptacle 88 on the underside or support side 82 of supporting body 80. Clamp body 140 comprises a screw mounting 141 into which the screw section on axle beam 68 of retaining body 66 can be screwed. Screw mounting 141 is located on a base section 142, which for example has an elongated shape. Clamp body 140 is made of plastic or metal, for example. Base section 142 is reinforced by lateral reinforcing legs 142 running along its longitudinal sides. Rear engagement contours 145 are provided at the longitudinal end regions 144 of base section 142, namely on side legs 146. Side legs 146 and reinforcing legs 143 define a substantially cuboid-shaped receiving space. For example, clamp body 140 is a stamped and bent part. Rear engagement contours 145 project outwards in front of longitudinal end region 144 and engage in guide seats 77 of support body 70. Clamp body 140 is thus mounted on support body 70 so that it can be moved along the linear axis LA of supporting body bearing 85. Supporting body bearing 85 thus comprises a sliding bearing 85A.

Rear engagement contours 78 are provided on guide seats 77, which are engaged from behind by rear engagement contours 145. Rear engagement contours 78 are, for example, the side legs of guide seats 77 projecting inwards and/or in the direction of wall body 76. Longitudinal slots 79 of guide seats 77, in which guide projections 89 protruding from supporting body 80 engage, are provided between rear engagement contours 78 and wall body 76. Supporting body 80 is thus guided directly into guide seats 77 by its guide projections 89. For example, two guide projections 89 are provided close to the narrow sides 88, i.e. on opposite sides of supporting body 80, to engage in the two guide seats 77 or longitudinal slots 79.

Clamp body 140 is advantageously loaded in its release position by a spring 147, in which rear engagement contours 145 have a distance to rear engagement contours 78 of guide seats 77. When retaining body 67 is released, i.e. unscrewed from clamp body 140, spring 147 loads clamp body 140 in the direction of a release position. However, clamp body 140 can be removed by the actuation of operating handle 69 or retaining body 67 can be brought into the clamping position, in which the rear engagement contours 145 are actuated in the direction of support legs 82 of supporting body 80, so that rear engagement contours 78 of support body 70 are clamped between supporting body 80 and rear engagement contours 145 or clamp body 140.

In this connection, retaining body 67 penetrates a guide seat 97 of transverse stop body 90. Guide seat 97 forms a guide component in which retaining body 67, in particular its axle beam 68, engages in the manner of a guide projection 67B and is guided as another guide component.

When retaining body 67 assumes its release position, on the one hand the locking of clamp body 140 with support body 70 is released, on the other hand the transverse stop body 90 can be displaced relative to supporting body 80, namely along a longitudinal extension of guide seat 97.

Furthermore, guide projections 96, namely on its support side 92, are provided on transverse stop body 90, which engage in guide seats 86 of supporting body 80 on its upper side or supplementary supporting surface 81. Guide projections 96 and guide seats 86 have an elongated shape and/or have receptacle recesses or projections at a longitudinal distance from each other, so that they form a longitudinal guide parallel to the course of guide seat 97.

Retaining body 67 and guide seat 97 form components of a linear bearing or sliding bearing 95A of transverse stop bearing 95, which enables transverse stop body 90 to be adjusted in relation to supporting body 80 and thus support body 70 along a linear axis LB.

Retaining body 67 can also be referred to as a clamp body or clamping body whose operating handle 69 forms a clamp head or clamp contour.

If retaining body 67 is moved sufficiently far into its release position so that operating handle 69 is at a sufficient distance from clamp body 140, transverse stop body 90 can be moved away from supporting body 80 so far that guide projections 96 are out of engagement with guide seats 86 and thus transverse stop body 90 can be pivoted around the axis of the axle beam 86, which then forms a bearing axis. A pivoting bearing 95B is thus realised, which enables a rotation of transverse stop body 90 relative to support body 70 and thus relative to workpiece support assembly 50.

Guide seat 97, a guide slot so to speak, runs advantageously between the longitudinal transverse stop faces 93, in particular approximately transversely in the middle. Guide seat 97 extends from a region close to short transverse stop face 94B in the direction of the other transverse stop face 94A, but has a greater distance to this one than to transverse stop face 94B. Thus, by rotating transverse stop body 90 about a pivoting axis S of the pivoting bearing 95B defined by axis beam 68, either transverse stop face 94A or 94B can be brought closer to workpiece support assembly 50, in particular base support face 53. Transverse stop body 90 protrudes like a telescopic arm towards base supporting surface 53.

It can be seen in the drawing that transverse stop body 90 can even be adjusted at least partially to base supporting surface 53, resulting in the advantageous characteristic that at least one transverse stop face 93 and/or 94 can be adjusted in a region above base supporting surface 53.

FIG. 5 shows, for example, a configuration in which a screw clamp Z clamps the workpiece W1 to the supporting body 80, with one narrow side of a longitudinal end region of the workpiece W1 also abutting transverse stop face 94 of transverse stop body 90. This is supported, for example, by supporting projections 98 on the upper side of workpiece support assembly 50, namely base supporting surface 53.

Support projections 93 have the advantage that there is a receiving or passage space for chips between the underside or supporting side 91 of transverse stop body 90 and the surface opposite it, for example base supporting surface 53.

By actuating the clamping screw or the retaining body 67, the mounting of both supporting body bearing 85 and transverse stop bearing 95 can be loosened or established, thus ensuring simple operation. Consequently, the various bearing surfaces and stop faces of the supplementary support assembly 60 can be brought into a release position and thus into a relative adjustment position and fixed relative to each other by actuating a single operating handle 69. This results in a particularly simple operation.

However, it is also possible to detach the individual components, namely supporting body 80 and transverse stop body 90 from one another and to connect or screw them together again in other positions.

For example, support body 90 is provided with an arrangement of mounting seats 150, 151 for the transport of supplementary support assembly 60 on workpiece support assembly 90. Support body 70, which is moved to transport position TS, forms a mounting base for supporting body 80. Retaining body 67 can be screwed into clamp body 140 by penetrating guide seat 97 in order to clamp/lock the rear engagement contours 145 in a rear engagement with mounting brackets 150, namely in the rear engagement with clamping sections 153 of the same. Rear engagement contours 145 can be inserted into the mounting brackets 150 by means of insertion distances 152 and then moved until at least one of the rear engagement contours 145 stops against a longitudinal stop 154 of one of the mounting brackets 150, 151. Clamp body 140 then is actuated to its clamping position.

A further, alternative fixing of transverse stop body 90 and supporting body 80 is shown in FIG. 7. Here, retaining body 67 is screwed through guide seat/guide slot 97 of transverse stop body 90 into a screw receptacle 87 on the support side or the underside 82 of supporting body 80, wherein supporting body 80 and transverse stop body 90 are arranged on opposite sides of support body 70, for example on supporting surface 71 or base surface 72. Axle beam 86, for example, penetrates bearing seat 64.

A central section of the support side 82 of supporting body 80 extending between guide projections 89 is supported on wall body 76 of support body 70. From the other side, i.e. in FIG. 7 from below, transverse stop body 90 acts as additional support and bracing. This lies with its support side 92 flat against wall body 76. It can be seen that this provides an extremely resilient configuration that also allows the placement of heavy workpieces W1 or W2.

Bearing seat 64 is preferably designed as an elongated hole, so that, for example, the above-mentioned configuration according to FIG. 7 can be adjusted in the elongated hole of bearing seat 64 along the linear axis LA. Optimum support is provided by the fact that supporting body 80 is both guided in both guide seats 77 and can be clamped using clamp body 140.

Transverse stop faces 93, 94 can be used, for example, as longitudinal stops (FIG. 5) or side stops (FIG. 1 or 2) of workpiece W1. However, they are also ideally suited as stop faces for machining high-standing workpieces, for example workpiece W2, especially ceiling profiles. In FIG. 1, for example, only one supplementary support assembly 60 is delineated to the right of the linear axis L. A further supplementary support assembly 60 could also be easily arranged to the left of it, namely on the workpiece support assembly 50A, so that the workpiece W2 is optimally supported on both sides or on opposite sides of tool 24.

Furthermore, aids, such as so-called sacrificial strips or spoil boards, can easily be connected to supplementary support assembly 60. It is also possible for these to remain permanently on their component, for example support body 70, supporting body 80 or transverse stop body 90, because each of these components can be separated from workpiece support assembly 50 and/or from the respective other component and can be detachably connected to it again.

For example, openings 170, 180 and 190 can be provided on support body 70, supporting body 80 and transverse stop body 90, through which screws can be screwed into the workpiece W1 or W2 or also into a support body not shown in the drawing, for example a wooden strip. If such an auxiliary body is connected to two supporting bodies 80 and/or transverse stop bodies 90 belonging to two independent supplementary support assemblies 60, 60B located, for example, on opposite sides of tool 24 (FIG. 3), this overall configuration can be left as it were screwed and removed from the machine tool 20 or reattached if necessary.

However, a hooking of a retaining body, for example, is also conceivable. For example, one of transverse stop faces 93 or 94, for example transverse stop face 94A, can be provided with a retaining fixture 191 for a screw head. This can, so to speak, be hooked into retaining fixture 191 (FIG. 2).

A support body or transverse stop body 290 shown in FIG. 3 can, for example, be used in conjunction with one or more supplementary support assemblies 60. Transverse stop body 290 is plate-like. Transverse stop body 290 has an elongated shape. Transverse stop body 290 has a central section 291, which is intended to rest on workpiece support surface 31, i.e. the machining table 30. The middle section 291 is located between mounting sections 294, 295. Kerfs can be provided in the middle section 291. However, the kerfs can also occur when using transverse stop body 92 if tool 24 cuts or penetrates into transverse stop body 290.

Mounting section 295 is preferably intended for mounting on, for example, supplementary support assembly 60 shown in FIG. 3, which is located on the workpiece support assembly 50B. On the other hand, mounting section 294 can be supported on one of the side supports 29, in particular side supporting surfaces 32 provided there, or alternatively also on a further supplementary support assembly 60B arranged on the workpiece support assembly 50A, in particular if this is arranged closer to machine tool 20.

A screw connection with a screw SB penetrating the opening 180 of supporting body 80, which is or will be screwed into the transverse stop body 290, is suitable for the connection of transverse stop body 290 to supplementary support assemblies 60, 60B, for example.

Mounting section 295 also has an opening 296, which can be penetrated by, for example, a retaining leg of the screw clamp Z, so that it can clamp transverse stop body 290 with supporting body 80 of supplementary support assembly 60.

Transverse stop body 290 has an elongated transverse stop face 293, against which, for example, workpiece W2 can be supported. On the longitudinal side opposite the transverse stop face 293, an equally straight longitudinal side connecting mounting sections 294, 295 by the shortest route would obstruct the operation of machine tool 20. To remedy this, an outer circumferential contour 297 of transverse stop body 290 is adapted to the circumferential contour of machine tool 20 in the region of workpiece support surface 31. For example, starting from mounting sections 294, 295, recesses 292 are provided which correspond approximately to the recesses between the side supports 29 and machining table 30 which is round in plan view. A round section 298 extends between recesses 292 of the outer circumferential contour 297, which approximately corresponds to the outer circumferential contour of machining table 30.

Transverse stop body 290 may form part of a system which comprises the transverse stop body and one or more of supplementary support assemblies 60.

However, transverse stop body 290 can also be produced when needed, for example from wood or other material that can be milled and/or sawn. A template 390 which has a circumferential contour 397 corresponding to circumferential contour 297, e.g. recesses 392 for recesses 292, a central section 391 corresponding to section 291 and a marking 396 for a hole or opening of the type of opening 296, is suitable for producing transverse stop body 290. The template 390 can be placed on a plate-like workpiece, in particular a wooden workpiece, for example a wooden panel or the like, in order to follow the circumferential contour 397 or to saw directly along template 390 according to the circumferential contour 397, for example with a jigsaw.

Supporting body 80 can have one or more integral transverse stop faces 193, 194. Transverse stop faces 193, 194 are angled to the supplementary supporting surface 81, in particular at right angles. It is preferable if transverse stop faces 193, 194 are also at an angle to each other. For example, transverse stop faces 193, 194 are provided on a transverse stop section 190 of supporting body 80, which projects in front of supplementary supporting surface 81.

Figure 12:
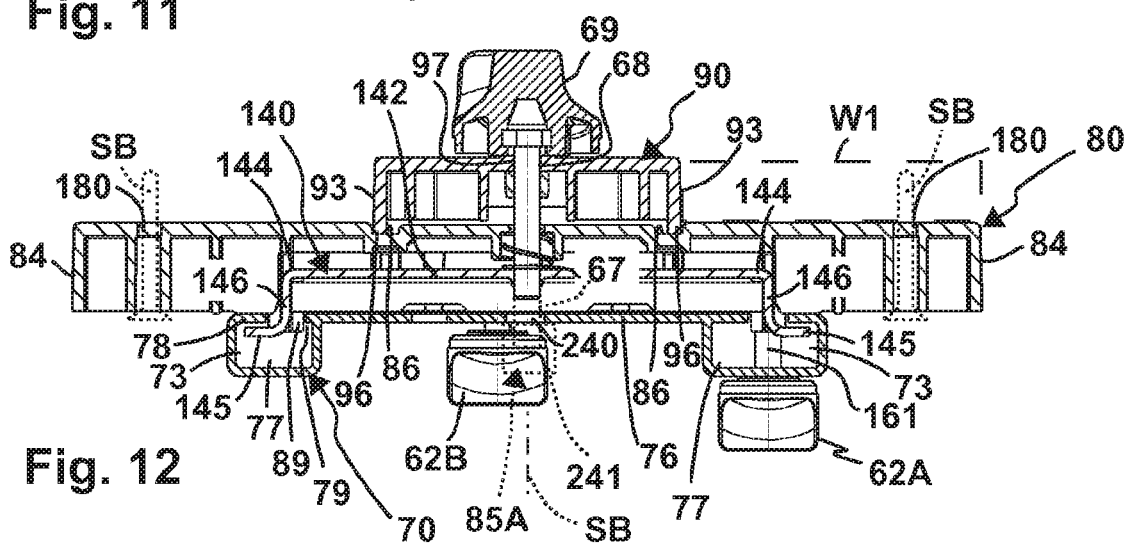

If, for example, according to an embodiment shown in FIG. 12, the connector 67 penetrates a bearing seat 240 on support body 70, for example its wall body 76, and is screwed into a nut 241, supporting body 80 can be pivotably mounted with respect to support body 70 around a pivot axis SB so that supporting body bearing 85 includes a pivoting bearing 85B.

The invention claimed is:

1. A supplementary support assembly for a workpiece support assembly of a semi-stationary machine tool wherein a workpiece support body of the workpiece support assembly has a base supporting surface which is substantially horizontal during use for supporting a workpiece for machining by a tool of the machine tool,
wherein the supplementary support assembly has a supplementary supporting surface and a support body with support body mounting means for detachable mounting on the workpiece support assembly,
wherein, when the supplementary support assembly is mounted on the workpiece support assembly, the supplementary supporting surface is at least substantially aligned with the base supporting surface, the supplementary support assembly further comprising a supporting body which is mounted by means of a support body bearing comprising a sliding bearing on the support body, the supporting body being movable between at least two different positions relative to the base supporting surface in a first linear path and can be detachably fixed on the support body in the relative positions by means of supporting body fixing means,
wherein the supporting body comprises the supplementary supporting surface or forms a mounting base for a transverse stop body which can be detachably mounted on the supporting body by means of stop body fixing means and has at least one transverse stop face which is at an angle to the supplementary supporting surface, and wherein the stop body is slidable relative to the supporting body in a second linear path, the second linear path being parallel to the first linear path.

2. The supplementary support assembly according to claim 1, wherein the supporting body has at least one transverse stop face, which is arranged in a stationary manner on the supporting body and is at an angle to the supplementary supporting surface.

3. The supplementary support assembly according to claim 1, wherein the transverse stop body is movably mounted on the supporting body by means of a transverse stop bearing comprising a pivoting bearing or a sliding bearing, and the transverse stop body having a first stop face, and the stop body having a first position wherein the first stop face extends across the base supporting surface forming a first workpiece stop for restricting workpiece motion along a first axis extending along a linear extent of the base supporting surface, and the transverse stop body having a second stop face perpendicular to the first stop face, and the transverse stop body having a second position wherein the second stop forms a second workpiece stop for restriction workpiece motion in a second axis perpendicular to the first axis.

4. The supplementary support assembly according to claim 3, wherein the transverse stop bearing has a first guide component arranged on the supporting body and a second guide component arranged on the transverse stop body, wherein one guide component of which is a guide seat, in which a guide projection of the other guide component engages and on which the guide projection is guided.

5. The supplementary support assembly according to claim 4, wherein in that at least one of the guide components comprises or forms a clamping body, which comprises or forms stop body fixing means, wherein the transverse stop body can be clamped to the supporting body by means of the clamping body.

6. The supplementary support assembly according to claim 4 wherein the guide seat has a longitudinal shape and the guide projection is mounted in the guide seat so as to be longitudinally displaceable along a sliding axis.

7. The supplementary support assembly according to claim 6, wherein the guide projection is rotatably mounted on the guide seat.

8. The supplementary support assembly according to claim 4, wherein the guide seat extends transversely or parallel to at least one transverse stop face of the transverse stop body or between opposite transverse stop faces of the transverse stop body, so that the transverse stop face is adjustable along the sliding axis of the guide seat relative to the supporting body.

9. The supplementary support assembly according to claim 8, wherein the guide seat extends between transverse stop faces provided on opposite sides of the transverse stop body, wherein the guide seat has a greater distance to one transverse stop face than to the other transverse stop face.

10. The supplementary support assembly according to claim 3, wherein the transverse stop bearing and the supporting body bearing have at least two different degrees of freedom of movement.

11. The supplementary support assembly according to claim 2, wherein the supporting body and the transverse stop body are each independently adjustable with respect to the support body.

12. The supplementary support assembly according to claim 3, wherein the transverse stop bearing is arranged between guide seats of the supporting body bearing.

13. The supplementary support assembly according to claim 1, wherein the transverse stop body is mounted with respect to the support body by means of the supporting body so as to be telescopic with respect to at least one telescopic axis.

14. The supplementary support assembly according to claim 1, wherein the supporting body fixing means are at least partially formed by the stop body fixing means.

15. The supplementary support assembly according to claim 1, wherein at least one retaining body or actuating body of the stop body fixing means is provided and configured for fixing the supporting body relative to the support body.

16. The supplementary support assembly according to claim 1, wherein the supporting body can be clamped in a sandwich-like manner between the support body and the transverse stop body.

17. The supplementary support assembly according to claim 1, wherein the supplementary supporting surface of the supporting body projects laterally in front of the support body on at least one side, in the sense of an enlargement of a total supporting surface formed by the base supporting surface and the supplementary supporting surface.

18. The supplementary support assembly according to claim 1, wherein the supplementary support assembly can be arranged, on the workpiece support assembly in a transport position and in a use position by means of the support body mounting means, wherein a support section of the support body projects further in front of the workpiece support assembly in the use position than in the transport position for supporting the supporting body.

19. The supplementary support assembly according to claim 18, wherein the support body mounting means comprise at least one bearing component or a bearing seat, of a transport bearing by means of which the support body is mounted so as to be movable between the transport position and the use position with respect to the workpiece support assembly.

20. The supplementary support assembly according to claim 1, wherein at least one component of the supplementary support assembly, forms a fixing device for fixing at least one component of the workpiece support assembly in a position suitable for transport on the workpiece support body of the workpiece support assembly.

21. The supplementary support assembly according to claim 20, wherein the at least one component of the workpiece support assembly is a support for supporting the workpiece support body, which is fixed or fixable by the component of the supplementary support assembly in a position resting against the workpiece support body.

22. The supplementary support assembly according to claim 1, wherein the support body bearing has two guide seats which extend parallel to a sliding axis of the supporting body bearing and are spaced apart from one another transversely to the sliding axis and in which guide projections are guided parallel to the sliding axis.

23. The supplementary support assembly according to claim 1, wherein the pairs of guide seat and guide projection are arranged at opposite longitudinal side regions or edge regions of the support body.

24. The supplementary support assembly according to claim 1, wherein the supporting body fixing means have at least one clamp body which can be clamped with one of the guide seats or have at least one rear engagement contour, which can be brought into rear engagement with one of the guide seats such that the supporting body is held on the guide seat on all sides transversely to the sliding axis.

25. The supplementary support assembly according to claim 1, wherein the support body fixing means are designed and provided for fixing the supporting body on opposite sides of the support body.

26. The supplementary support assembly according to claim 1, wherein the supporting body or the workpiece support body is designed as a profile body or as an extruded profile.

27. The supplementary support assembly according to claim 1, wherein the support body or the workpiece support body have a guide seat with a retaining contour for rear engagement by a rear engagement contour or a sliding block.

28. The supplementary support assembly according to claim 1, wherein at least one of the supporting body, the support body and the transverse stop body is plate-like.

29. The supplementary support assembly according to claim 1, wherein at least one of the supporting body, the support body and the transverse stop body has at least one opening for the screwing of a body, with the screw provided with the supporting body or the support body or the transverse stop body and at least one retaining receptacle for a retaining body screwed into the workpiece or a support for the workpiece.

30. The supplementary support assembly according to claim 1, further comprising a transverse stop body having a circumferential contour adapted to correspond to an outer circumferential contour of the machine tool.

31. The supplementary support assembly according to claim 1, wherein the supplementary support assembly is provided and designed for mounting on a longitudinal side of the workpiece support assembly, wherein the longitudinal side runs along a longitudinal extension of the workpiece support assembly and is longer than a transverse side of the workpiece support assembly.

32. The supplementary support assembly according to claim 1, wherein the support body mounting means form bearing components of an adjusting bearing with which the supplementary support assembly can be adjusted relative to the workpiece support body between at least two different use positions, with respect to a longitudinal extension of the workpiece support body, in each of which the supplementary supporting surface for supporting a workpiece is available.

33. The supplementary support assembly according to claim 1, wherein the at least one transverse stop face or the transverse stop body is adjustable into a region on the base supporting surface or into a position supported on the base supporting surface.

34. The supplementary support assembly according to claim 1, wherein the supporting body fixing means or the stop body fixing means for mounting the supporting body and the transverse stop body are provided and configured on opposite sides of the support body.

35. The supplementary support assembly according to claim 1, wherein the support body has a supporting surface for supporting the supporting body, which, when the support body mounted on the workpiece support assembly, is aligned with an underside of the workpiece support assembly provided for the mounting of the support body or rests at least substantially flat against an underside of the workpiece support assembly provided for the mounting of the support body.

36. The supplementary support assembly according to claim 1, wherein the support body, when the support body is mounted on the workpiece support assembly, projects laterally in a shelf-like manner laterally in front of the workpiece support assembly.

37. The supplementary support assembly according to claim 1, wherein a distance between the supplementary supporting surface and an underside of the supporting body is equal or substantially equal to a distance between the base supporting surface of the workpiece support assembly and an underside of the workpiece support assembly provided for fastening the support body.

38. A supplementary support assembly for a workpiece support assembly of a semi-stationary machine tool, wherein
a workpiece support body of the workpiece support assembly has a base supporting surface which is substantially horizontal during use for supporting a workpiece for machining by a tool of the machine tool, wherein
the supplementary support assembly has a supplementary supporting surface and a support body with support body mounting means for detachable mounting on the workpiece support assembly, wherein
when the supplementary support assembly is mounted on the workpiece support assembly, the supplementary supporting surface is at least substantially aligned with the base supporting surface the supplementary support assembly further comprising a supporting body which is mounted by means of a support body bearing comprising a sliding bearing on the support body, the supporting body being movable between at least two different positions relative to the base supporting surface and can be detachably fixed on the support body in the relative positions by means of supporting body fixing means, wherein
the supporting body comprises the supplementary supporting surface or forms a mounting base for a transverse stop body which is detachably mounted on the supporting body by means of stop body fixing means and has at least one transverse stop face which is at an angle to the supplementary supporting surface, and wherein
the supporting body has at least one transverse stop face, which is arranged in a stationary manner on the supporting body and is at an angle to the supplementary supporting surface, and wherein the transverse stop bearing is arranged between guide seats of the supporting body bearing.

39. A supplementary support assembly for a workpiece support assembly of a semi-stationary machine tool wherein
a workpiece support body of the workpiece support assembly has a base supporting surface which is substantially horizontal during use for supporting a workpiece for machining by a tool of the machine tool, wherein
the supplementary support assembly has a supplementary supporting surface and a support body with support body mounting means for detachable mounting on the workpiece support assembly, wherein,
when the supplementary support assembly is mounted on the workpiece support assembly, the supplementary supporting surface is at least substantially aligned with the base supporting surface the supplementary support assembly further comprising a supporting body which is mounted by means of a support body bearing comprising a sliding bearing on the support body, the supporting body being movable between at least two different positions relative to the base supporting surface and can be detachably fixed on the support body in the relative positions by means of supporting body fixing means, wherein
the supporting body comprises the supplementary supporting surface or forms a mounting base for a transverse stop body which is detachably mounted on the supporting body by means of stop body fixing means and has at least one transverse stop face which is at an angle to the supplementary supporting surface, and wherein
the support body has a supporting surface for supporting the supporting body, which, when the support body mounted on the workpiece support assembly, is aligned with an underside of the workpiece support assembly provided for the mounting of the support body or rests at least substantially flat against an underside of the workpiece support assembly provided for the mounting of the support body.

40. A supplementary support assembly for a workpiece support assembly of a semi-stationary machine tool wherein
a workpiece support body of the workpiece support assembly has a base supporting surface which is substantially horizontal during use for supporting a workpiece for machining by a tool of the machine tool, wherein
the supplementary support assembly has a supplementary supporting surface and a support body with support body mounting means for detachable mounting on the workpiece support assembly, wherein
when the supplementary support assembly is mounted on the workpiece support assembly, the supplementary supporting surface is at least substantially aligned with the base supporting surface the supplementary support assembly further comprising a supporting body which is mounted by means of a support body bearing comprising a sliding bearing on the support body, the supporting body being movable between at least two different positions relative to the base supporting surface and can be detachably fixed on the support body in the relative positions by means of supporting body fixing means, wherein
the supporting body comprises the supplementary supporting surface or forms a mounting base for a transverse stop body which can be detachably mounted on the supporting body by means of stop body fixing means and has at least one transverse stop face which is at an angle to the supplementary supporting surface, and wherein a distance between the supplementary supporting surface and an underside of the supporting body is equal or substantially equal to a distance between the base supporting surface of the workpiece support assembly and an underside of the workpiece support assembly provided for fastening the support body.

\* \* \* \* \*